B. NEWTON.
BEET AND GRAIN DRILL ATTACHMENT.
APPLICATION FILED MAR. 31, 1914.

1,134,894.

Patented Apr. 6, 1915.
2 SHEETS—SHEET 1.

Witnesses:
C. Feinle, Jr.
Dudley B. Howard

Inventor,
Byron Newton.
By Victor J. Evans.
Attorney.

THE NORRIS PETERS CO., PHOTO-LITHO., WASHINGTON, D. C.

B. NEWTON.
BEET AND GRAIN DRILL ATTACHMENT.
APPLICATION FILED MAR. 31, 1914.
1,134,894.
Patented Apr. 6, 1915.
2 SHEETS—SHEET 2.
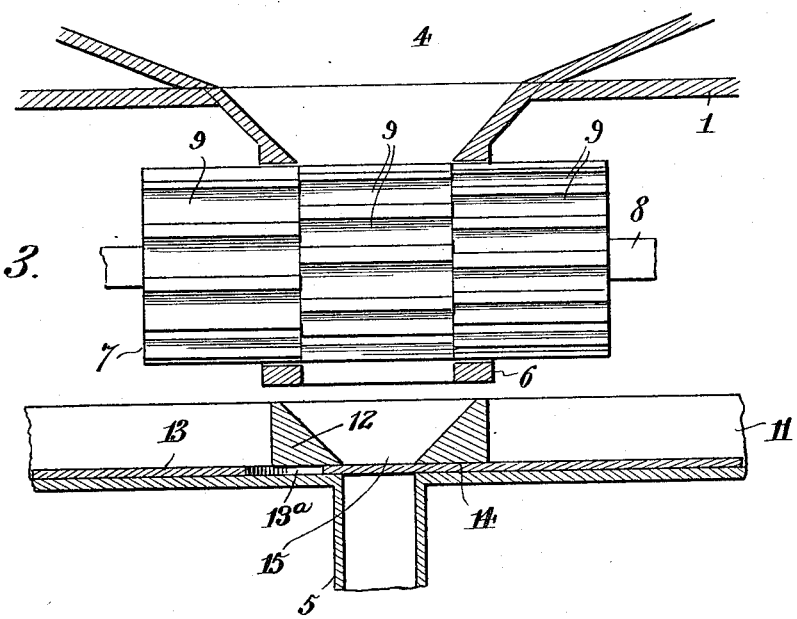
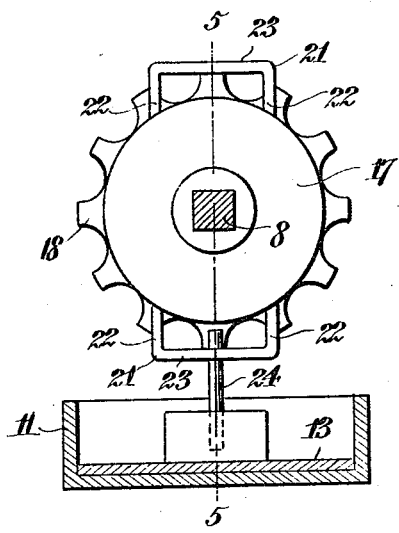
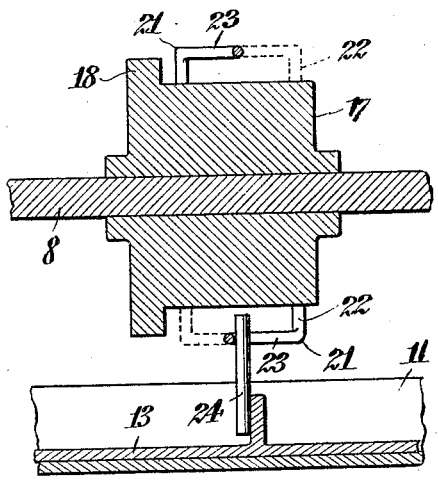
Inventor,
Byron Newton.
By Victor J. Evans,
Attorney.
Witnesses:
C. Feinle, Jr.,
Dudley B. Howard

UNITED STATES PATENT OFFICE.

BYRON NEWTON, OF FORT COLLINS, COLORADO.

BEET AND GRAIN DRILL ATTACHMENT.

1,134,894.  Specification of Letters Patent.  Patented Apr. 6, 1915.

Application filed March 31, 1914. Serial No. 828,532.

*To all whom it may concern:*

Be it known that I, BYRON NEWTON, a citizen of the United States, residing at Fort Collins, in the county of Larimer and State of Colorado, have invented new and useful Improvements in Beet and Grain Drill Attachments, of which the following is a specification.

This invention relates to a checking attachment for seed drills, with particular reference to the type of drill used in planting beet seed.

Heretofore in the beet-raising industry, the seed has been planted in rows by the use of a drill which spaces the seeds regularly a very short distance apart, but it has been found that it is more desirable to check the seed so as to form hills such as those formed when corn is planted.

It is the purpose of my invention to provide an attachment for the drills heretofore used in planting beet seed, whereby it will not be necessary to abandon the drills already constructed, but which will serve to convert the same into check-row planters without necessitating any material changes in the construction of the same.

A further object of the invention is to provide a checking attachment of the character set forth which is adapted to operate in connection with all of the spouts upon the drill simultaneously in order to arrange the hills of seed in rows which extend transversely to the path of travel of the drill.

Figure 1:
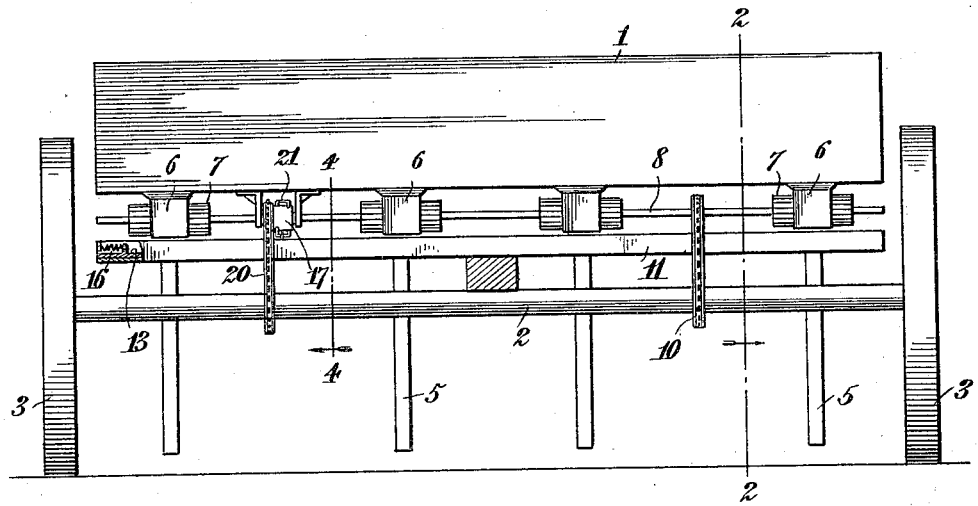
Figures 2, 6:
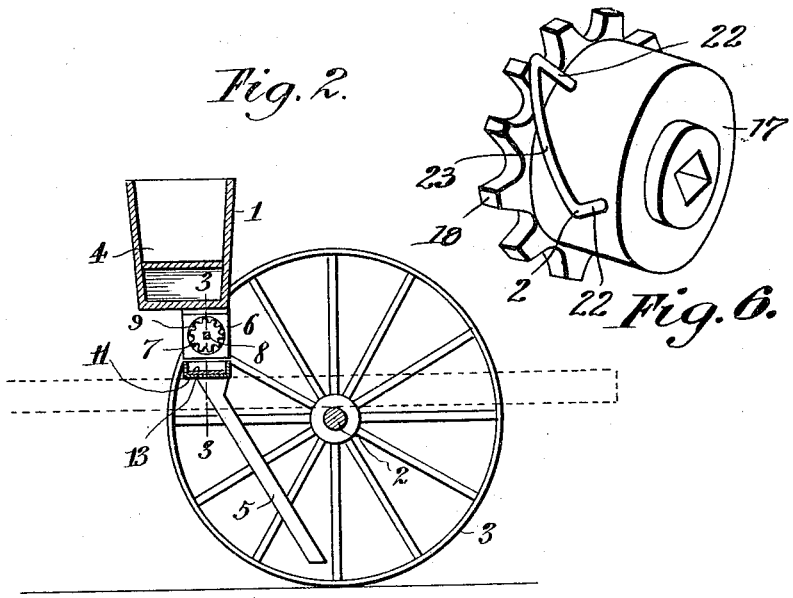

The invention consists in the features of construction, combination, and arrangement of parts, hereinafter fully described, and claimed, reference being had to the accompanying drawings, in which:

Figure 1 is a rear elevation of a beet seed drill having the attachment applied thereto; Fig. 2 is a vertical sectional view on line 2—2 of Fig. 1; Fig. 3 is a vertical sectional view on line 3—3 of Fig. 2; Fig. 4 is a vertical sectional view on line 4—4 of Fig. 1; Fig. 5 is a vertical sectional view on line 5—5 of Fig. 4; and Fig. 6 is a detail perspective view of the operating block.

In the drawings, the numeral 1 designates the main hopper of a well known type of beet seed drill, which is mounted upon the rotatable driving axle 2, the latter being connected fixedly with the supporting wheels 3. As is usual, the hopper 1 is divided into a plurality of longitudinally spaced compartments 4, each of which discharges into a grain spout 5 through a feeding box 6, through which a regulating cylinder 7 extends. The cylinders of the respective feeding boxes are mounted fixedly upon a common shaft 8, and this shaft is longitudinally adjustable besides being rotatably mounted. Each cylinder 7 includes a plurality of sections, the pockets 9 in one section being larger or greater in number than the pockets of adjacent sections, whereby, when the said shaft is adjusted longitudinally, the seed may be regulated in its rate of discharge. The operating shaft 8 for the feeding boxes is connected with the drive shaft 2 by means of a sprocket and chain connection, such as is indicated at 10, or some other power transmission means may be employed if found desirable.

The attachment which forms the basis of my invention includes an elongated trough-shaped frame 11, which is adapted to be mounted upon the drill so as to be interposed between the bottoms of the feeding boxes and the mouths of the grain spouts. This frame is provided with a plurality of longitudinally spaced blocks 12 having vertical openings 15 adapted to aline with the said mouths, the said openings being flared upwardly to provide auxiliary hoppers into which the grain will fall from the respective feeding boxes. A longitudinally adjustable slide plate 13 is mounted upon the bottom of the frame 11 and extends through the guide slots 14 provided in the blocks 12. The plate 13 is provided with longitudinally spaced openings 13$^a$ which are adapted to register with the respective openings 15 of the said blocks when the slide plate is in its inoperative position, but it is to be understood that the openings 15 may be closed upon movement of the slide plate longitudinally to a sufficient extent. An expansible spring 16 connects one end of the slide plates with the adjacent end of the member 11 and is adapted to maintain the said plate normally in its operative position. A cylindrical operating block 17 is slidably mounted upon the shaft 8, but is secured against rotation thereon, owing to the fact that the said shaft and the receiving opening of the block are non-circular in section. A sprocket wheel 18 is connected with the block 17 for rotation therewith and is connected with a second driving shaft 2, by means of the sprocket chain 20. Two, diametrically opposite cam members 21 are mounted upon the outer periphery of the block 17. Each of these members 21 is substantially U-shaped and has its parallel arms 22 engaged within the block in such a manner that its axially disposed cross portion 23 will extend diagonally for engagement with a vertical pin 24, which projects upwardly from the slide plate 13, whereby the slide plate is thrust longitudinally into its inoperative position against the action of the spring 16, to cause discharge of the seed contained within the auxiliary hoppers of the shaft 8. Owing to the manner in which the block 17 is connected with the shaft 8, longitudinal adjustment of this shaft will not affect the said block.

The operation of the attachment will now be described. As the shaft 8 rotates, during movement of the implement over the ground in which the seed is to be planted, the active portions 23 of the respective cam members 21 upon the block 17 will move into engagement with the pin 24 in regular order. Each time the portion 23 of one of the cam members strikes the said pin, the latter will be forced laterally so as to move the plate 13 longitudinally within the frame 11 into open position, wherein the openings 13ª of the plate will register with the openings 15 in the blocks 12. Each time the plate 13 is thrust into open position in this manner, the seed which has accumulated in the hopper formed by each opening 15 will fall through the corresponding seed spout 5 into a hill. Upon further movement of each cam member, the pin 24 will ride past the same and will thus be released so as to permit the slide plate 13 to reassume its closed position, as caused by the action of the spring 16. The slide plate will thus reciprocate within the trough-shaped frame during the movement of the drill to cause the proper checking of the seed.

From the foregoing description, taken in connection with the accompanying drawings, it will be seen that I have provided a simply constructed and efficient attachment for seed drills of the ordinary type disclosed herein, which attachment may be applied to a drill of this type without making any extensive changes in its construction, and which may be detached therefrom when it is desired to use the drill in its old capacity. By the use of this attachment, the grain may be planted in hills and the checking operation will be performed positively and effectively. It is to be understood, however, that minor changes in the details of construction, such as fall within the scope of the appended claims, may be resorted to in practice if found necessary.

What I claim is:

1. The combination with a seed drill including a main hopper, a seed box arranged in communication with the hopper, a grain spout disposed with its mouth directly beneath the discharge end of the said box, and regulable means for feeding grain through the said box during movement of the drill proper, of an attachment therefor comprising a trough-shaped member interposed between the discharge end of the seed box and the mouth of the spout and having an upwardly flared hopper opening in alinement with the mouth of the spout, the said trough-shaped member being provided with a longitudinal guide slot communicating with the hopper opening, a slide plate movably mounted within the guide slot and having a vertical opening adapted to register with the hopper opening when the slide plate is in its inoperative position, yieldable means for normally maintaining the slide plate in its operative position, and means for operating the said plate into its inoperative position.

2. The combination with a seed drill including a main hopper, a seed box arranged in communication with the hopper, a grain spout disposed with its mouth directly beneath the discharge end of the said box, and regulable means for feeding grain through the said box during movement of the drill proper, of an attachment therefor comprising a trough-shaped member interposed between the discharge end of the seed box and the mouth of the spout and having an upwardly flared hopper opening in alinement with the mouth of the spout, the said trough-shaped member being provided with a longitudinal guide slot communicating with the hopper opening, a slide plate movably mounted within the guide slot and having a vertical opening adapted to register with the hopper opening when the slide plate is in its inoperative position, yieldable means for normally maintaining the slide plate in its operative position, and means associated with the feed-regulating means for causing successive movement of the said slide plate into its inoperative position, during operation of the feed-regulating means.

3. The combination with a seed drill including a main hopper, a seed box arranged in communication with the hopper, a grain spout disposed with its mouth directly beneath the discharge end of the said box, and regulable means for feeding grain through the said box during movement of the drill proper, including a rotatable operating shaft, of an attachment therefor comprising a trough-shaped member interposed between the discharge end of the seed box and the mouth of the spout and having an upwardly flared hopper opening in alinement with the mouth of the spout, the said trough-shaped member being provided with a longitudinal guide slot communicating with the hopper opening, a slide plate movably mounted within the guide slot and having a vertical opening adapted to register with the hopper opening when the slide plate is in its inoperative position, yieldable means for normally maintaining the slide plate in its operative position, a vertical pin provided upon the said slide plate, a cylindrical operating block mounted upon the shaft of the feed-regulating means for rotation therewith, and means provided upon the said block for engagement with the said pin to cause the slide plate to be thrown longitudinally into inoperative position at intervals during operation of the said shaft.

4. The combination with a seed drill including a main hopper, a seed box arranged in communication with the hopper, a grain spout disposed with its mouth directly beneath the discharge end of the said box, and regulable means for feeding grain through the said box during movement of the drill proper, including a rotatable operating shaft, of an attachment therefor comprising a trough-shaped member interposed between the discharge end of the seed box and the mouth of the spout and having an upwardly flared hopper opening in alinement with the mouth of the spout, the said trough-shaped member being provided with a longitudinal guide slot communicating with the hopper opening, a slide plate movably mounted within the guide slot and having a vertical opening adapted to register with the hopper opening when the slide plate is in its inoperative position, yieldable means for normally maintaining the slide plate in its operative position, a vertical pin provided upon the said slide plate, a cylindrical operating block mounted upon the shaft of the feed-regulating means for rotation therewith, and a diagonally extending cam member provided upon the outer periphery of the said block for engagement with the pin carried by the slide plate at intervals during operation of the said shaft.

In testimony whereof I affix my signature in presence of two witnesses.

BYRON NEWTON.

Witnesses:
 M. E. MORGAN,
 S. H. CAMMEN.

Copies of this patent may be obtained for five cents each, by addressing the "Commissioner of Patents, Washington, D. C."